US006834972B1

(12) United States Patent
Medimurec

(10) Patent No.: US 6,834,972 B1
(45) Date of Patent: Dec. 28, 2004

(54) ARTICULATED ARM OF THE REAR MIRROR

(75) Inventor: Slavko Medimurec, Grosuplje (SI)

(73) Assignee: Phophetes, D.D., Ljubljana (SI)

( * ) Notice: Subject to any disclaimer, the term of this patent is extended or adjusted under 35 U.S.C. 154(b) by 209 days.

(21) Appl. No.: 10/111,115

(22) PCT Filed: Oct. 18, 2000

(86) PCT No.: PCT/SI00/00022

§ 371 (c)(1), (2), (4) Date: Jun. 26, 2002

(87) PCT Pub. No.: WO01/28816

PCT Pub. Date: Apr. 26, 2001

(30) Foreign Application Priority Data

Oct. 19, 1999 (SI) .................................................. 9900239

(51) Int. Cl.[7] .......................... G02B 5/08; G02B 7/182; B60R 1/02
(52) U.S. Cl. ........................ 359/872; 359/876; 248/474; 248/478; 248/479; 248/484; 248/485
(58) Field of Search ................................. 359/872, 875, 359/876, 881, 842; 248/476, 477, 478, 479, 481, 483, 484, 485, 487, 469, 474

(56) References Cited

U.S. PATENT DOCUMENTS 470,211 A * 3/1892 Philips
970,636 A * 9/1910 Miller
1,490,304 A * 4/1924 Zink
1,521,508 A * 12/1924 Denoux
2,746,355 A * 5/1956 Wells
4,380,369 A * 4/1983 Schacht
4,382,572 A * 5/1983 Thompson
4,603,944 A * 8/1986 Greenlaw et al.
4,614,412 A * 9/1986 Cohen
5,076,701 A * 12/1991 Greenlaw

FOREIGN PATENT DOCUMENTS

| DE | 1916664 | * | 1/1965 |
| DE | 2212756 | * | 9/1973 |
| GB | 822393 | * | 10/1959 |

* cited by examiner

Primary Examiner—Ricky D. Shafer
(74) Attorney, Agent, or Firm—King & Jovanovic, PLC

(57) ABSTRACT

An articulated arm of the rear mirror for cars, bicycles and/or to that of an additional internal car rear mirror, suitable for efficient mounting either on the handlebar or inside the car and allowing for simple adjustment of the viewing position. The articulated rear mirror arm referred to in this invention allows for simple adjustment and arresting of the selected position by means of the articulated parts including the rod shaped structure of the carrier element, the intermediate connection element and the fixing element. The mirror is with its frame fixed to one end of the intermediate connection element, thereby forming an articulation.

1 Claim, 2 Drawing Sheets

ARTICULATED ARM OF THE REAR MIRROR

This application is a national stage application filed under 35 U.S.C. 371 of PCT/SI00/000022 filed on Oct. 18, 2000.

The invention refers to the articulated arm of the rear mirror, above all for cars, bicycles and/or motors or to that of an additional internal car rear mirror, suitable for efficient mounting either on the handlebar or inside the car and allowing for simple adjustment of the viewing position.

The technical problem successfully solved by the invention in question involves the design and the construction of such articulated rear mirror arm that will allow for simple and quick mounting of the rear mirror as well as for smooth adjustment of the appropriate angle and position of the rear mirror without requiring the application of any additional tool.

With the known versions of rear mirror arms, designed for mounting either in or on the handle of the bicycle, motor etc., the mirror is usually mounted on a short or long rod, provided on the other end with an appropriate fixing mechanism, depending on the fixing mode and on the available possibility. Such construction of the rear mirror arm, however, involves several deficiencies. Beside the fact that the possibility of adjustment of the appropriate mirror position is very limited, the screw-type links between the mirror housing and the fixing clamp often require the application of appropriate tools, e.g. a screw-driver or a special spanner.

Moreover, such mirror cannot be easily folded and/or removed in case of storage or riding through a narrow corridor.

Some better solution is guaranteed by the articulated arms where the rod is divided into two parts, so that it can be more easily folded. With this solution the problem of simple adjustment and arresting of the selected position is not completely solved either, because individual articulations are joined by screws that need to be released before the adjustment and tightened after the adjustment by using appropriate tools.

The articulated rear mirror arm referred to in this invention allows for simple adjustment and arresting of the selected position by means of the articulated parts including the rod shaped structure of the carrier element, the intermediate connection element and the fixing element. The mirror is with its frame fixed to one end of the intermediate connection element, thereby forming an articulation.

The invention will be explained in detail with reference to the concrete example and the respective figures, whereof:

Figure 1:
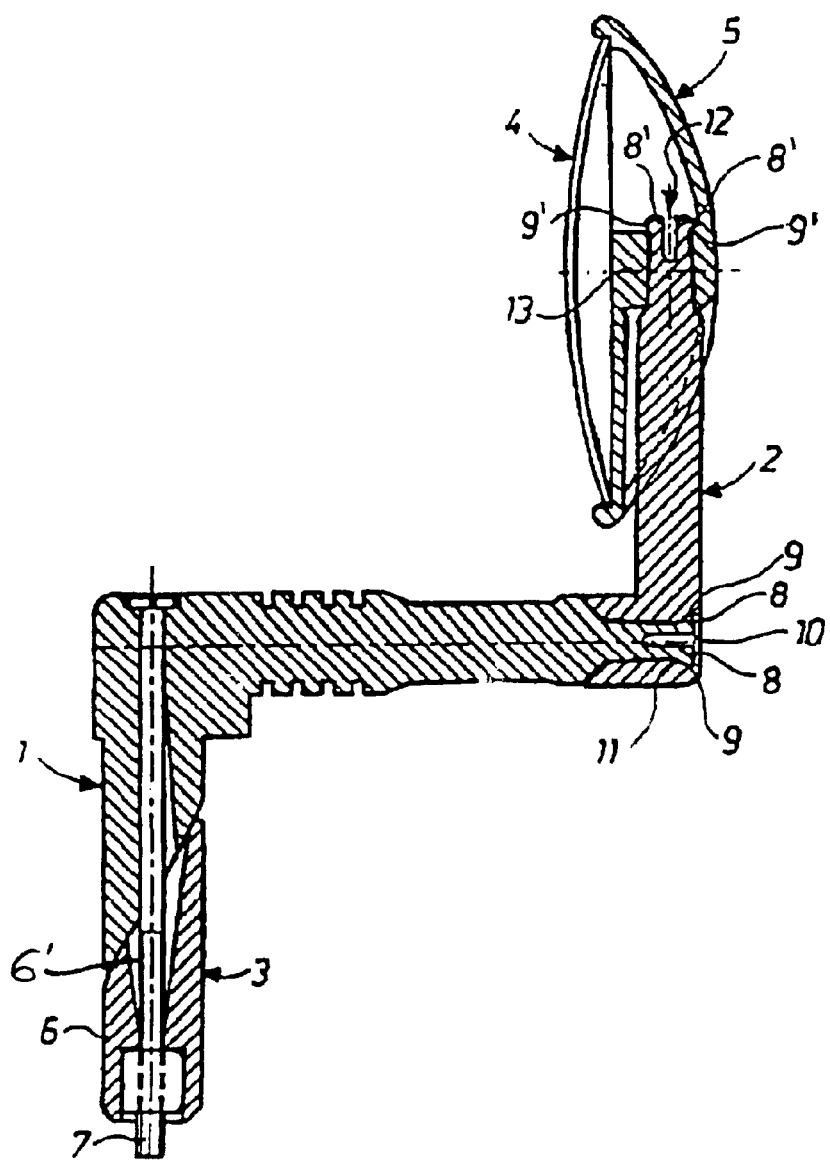
FIG. 1 shows the rear mirror along with the articulated arm referred to in this invention, according to the first example, shown as a cross-section.

The articulated rear mirror arm referred to in this invention and in the and in the example, such as shown as a cross-section in FIG. 1, consists of a rod shaped structure of the carrier element 1, the intermediate connection element 2 and the fixing element 3. The mirror 4 is with its frame 5 fixed to one end of he intermediate connection element 2, thereby forming an articulation.

As a matter of fact, the carrier element 1 of the articulated arm is a round profile rod bent under a 90° angle, provided on one end with a slanting edge whereto there fits snuggly under the same angle a slanting end of the fixing element 3 that consists of a short cylindrical pin 6' moved by means of a screw-type link 7 along the slanting edge of the carrier element 1 in order to obtain a firm contact of the fixing element 3 with the interior of the control rod provided for fixing of the whole arm. The initial mounting of such rear mirror arm, however, requires appropriate tools, e.g. a screw-driver, but it requires no disassembling.

On the other end the carrier element 1 is provided with two slightly conical springs 8, ending into a thick edge 9. The springs 8 fit into the hole 10 on one end of the intermediate connection element 2, provided with the element 11 into which the thick edge 9 fits upon the insertion of the springs 8 into the borehole 10. In this manner we get an inseparable contact of the carrier element 1 and the intermediate connection element 2 whereof the reciprocal position is easily adjustable, while the reciprocal link is sufficiently stiff.

On the other end of the intermediate connection element 2 there are also the two springs 8, ending in a thick edge 9' that fits into the hole 12 on the handle bar 13 of the frame 5. The sizes of the two springs 8' are harmonized with the gauge of the handle bar 13 in the way that after the insertion of the springs 8' the respective thick edge 9' extends outside the hole 12, which again provides for an inseparable contact of the intermediate connection element 2 and of the frame 5, whereby their reciprocal position is easily adjustable, while the respective link is sufficiently stiff.

Figure 2:
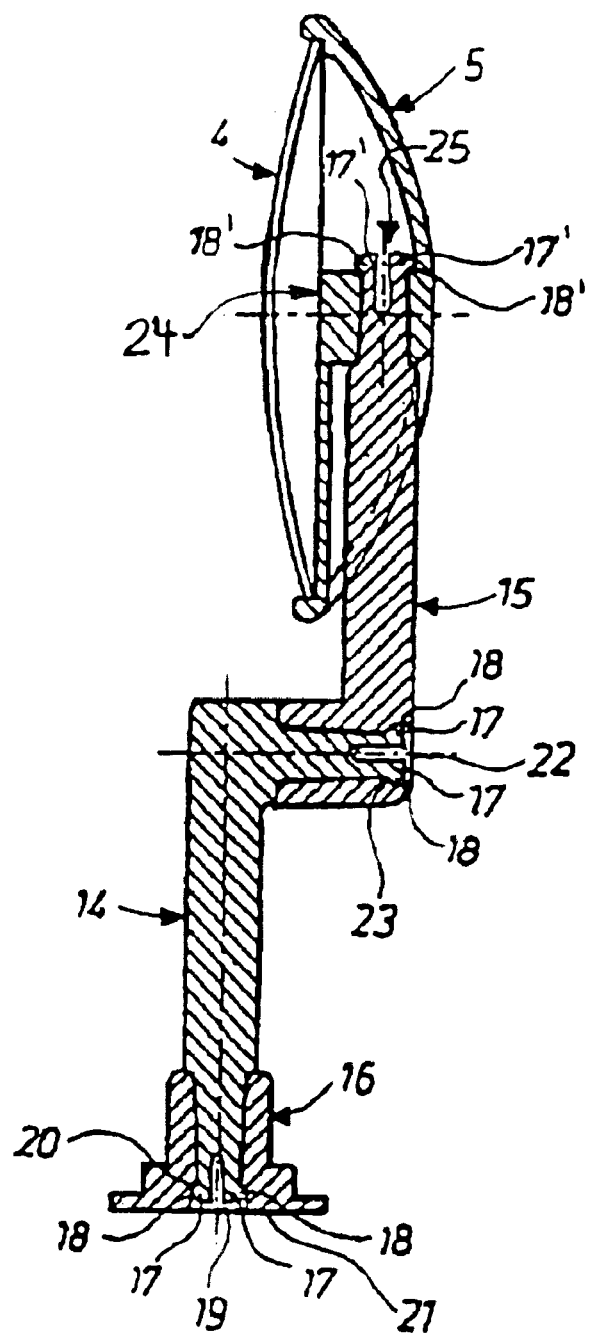
FIG. 2 shows the rear mirror along with the articulated arm referred to in this invention, according to the second example, shown as a cross-section.

The articulated rear mirror arm referred to in this invention and in example II, such as shown as a cross-section in FIG. 2, consists of a rod shaped structure of the carrier element 14, the intermediate connection element 15 and the fixing element 16. The mirror 4 is with its frame 5 fixed to one end of the intermediate connection element 15, thereby forming an articulation.

As a matter of fact, the carrier element 14 of the articulated arm is a round profile provided on both ends with two slightly conical springs 17, ending into a thick edge 18. The springs 17 on one end lie contrary to the springs 18 on the other end of the carrier element 14, shifted for a 90° angle. On one end the springs 17 fit into the corresponding hole 19 on the fixing element 16, provided with the element 20 into which the thick edge 18 fits upon the insertion of the springs 17 into the borehole 19. In this manner we get an inseparable contact of the carrier element 14 and of the fixing element 16 whereof the reciprocal position is easily adjustable, while the respective link is sufficiently stiff.

The fixing element 16 is provided on one end with a flat surface 21 that can be tightened by screw, stuck or otherwise fixed to a flat surface.

On the other end the carrier element 14 is provided with two slightly conical springs 17, ending into a thick edge 18. The springs 17 fit into the hole 22 on one end of the intermediate connection element 15, provided with the element 23 into which the thick edge 18 fits upon the insertion of the springs 17 into the borehole 22. In this manner we get an inseparable contact of the carrier element 14 and the intermediate connection element 15 whereof the reciprocal position is easily adjustable, while the reciprocal link is sufficiently stiff.

On the other end of the intermediate connection element 15 there are also the two springs 17', ending in a thick edge 18' that fits into the hole 25 on the handle bar 24 of the frame 5. The sizes of the two springs 17' are harmonized with the gauge of the handle bar 24 in the way that after the insertion of the springs 17' the respective thick edge 18' extends outside the hole 25, which again provides for an inseparable contact of the intermediate connection element 15 and of the frame 5, whereby their reciprocal position is easily adjustable, while the reciprocal link is sufficiently stiff.

What is claimed is:

1. An articulated rear mirror arm for use in association with a mirror positioned within a frame, the rear mirror arm comprising:

a rod structure including:
- a carrier element, including a first end and a second end, the first end including a slightly conical spring ending into a thick edge;
- an intermediate connection element associated with the carrier element, the intermediate connection element includes a first and second end, the first end including a slightly conical spring ending into a thick edge, and the second end including a hole, wherein the first end of the carrier element is positionable within the hole in the second end of the intermediate connection element, to, in turn, maintain the carrier element and the intermediate connection in engagement, and wherein the first end of the intermediate connection element is releasably associated to the frame; and a fixing part associated with the carrier element, to, in turn, provide an articulation of the arm, and, in turn, positioning of the mirror and frame.

\* \* \* \* \*